United States Patent
Tokumura et al.

(10) Patent No.: US 7,806,216 B2
(45) Date of Patent: Oct. 5, 2010

(54) VEHICULAR NUMBER PLATE

(75) Inventors: Daisuke Tokumura, Saitama (JP);
Toshihiko Kamio, Saitama (JP); Yuuji Watanuki, Saitama (JP); Shoji Yamamoto, Saitama (JP); Mikio Uchiyama, Saitama (JP); Hiroshi Yamada, Saitama (JP); Hiroyuki Maeda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 383 days.

(21) Appl. No.: 11/878,281

(22) Filed: Jul. 23, 2007

(65) Prior Publication Data
US 2008/0028656 A1    Feb. 7, 2008

(30) Foreign Application Priority Data
Jul. 26, 2006    (JP)    ............................. 2006-203640
Apr. 27, 2007    (JP)    ............................. 2007-118565

(51) Int. Cl.
*B62K 21/08*    (2006.01)
(52) U.S. Cl. ...................................... 180/219; 280/271
(58) Field of Classification Search ................. 180/219; 40/590; 280/271
See application file for complete search history.

(56) References Cited

U.S. PATENT DOCUMENTS

| | | | | |
|---|---|---|---|---|
| 3,921,323 A * | 11/1975 | Petty | ........................... | 40/204 |
| 4,077,145 A * | 3/1978 | Smoczynski | ................. | 40/590 |
| 4,396,086 A * | 8/1983 | Hattori | ........................ | 180/229 |
| 6,352,132 B1 * | 3/2002 | Horii et al. | .................. | 180/229 |
| 6,702,311 B2 * | 3/2004 | Tsukiji | .................... | 280/152.2 |
| D514,630 S * | 2/2006 | Tilbor | ........................ | D21/538 |
| 7,052,027 B2 * | 5/2006 | Gogo et al. | ................. | 280/272 |
| 7,552,791 B2 * | 6/2009 | Oohashi et al. | ............. | 180/219 |
| 2006/0260858 A1 * | 11/2006 | Suzuki | ........................ | 180/219 |

FOREIGN PATENT DOCUMENTS

JP            08099665 A  *  4/1996
JP        2005-96735 A        4/2005

* cited by examiner

*Primary Examiner*—Lesley Morris
*Assistant Examiner*—Michael R Stabley
(74) *Attorney, Agent, or Firm*—Birch, Stewart, Kolasch & Birch, LLP

(57) ABSTRACT

A vehicle number plate that allows a steering damper to be disposed without impairing the functions of the number plate, and is less susceptible to an effect of cross wind. The vehicle includes a front fork, which suspends a front wheel, disposed steerably on a head pipe on a vehicle body and a steering mechanism including a handlebar mounted on the front fork. The number plate is marked with a competition identification number and is disposed at a front portion of a fork bridge including a top bridge and a bottom bridge to connect left- and right-hand portions of the front fork. In the vehicle, the steering damper is disposed between the head pipe and the bottom bridge. The number plate includes a protruded portion that protrudes forwardly at a center thereof and narrows toward a lower portion, the lower portion covering an area forward of the steering damper.

20 Claims, 16 Drawing Sheets

FRONT

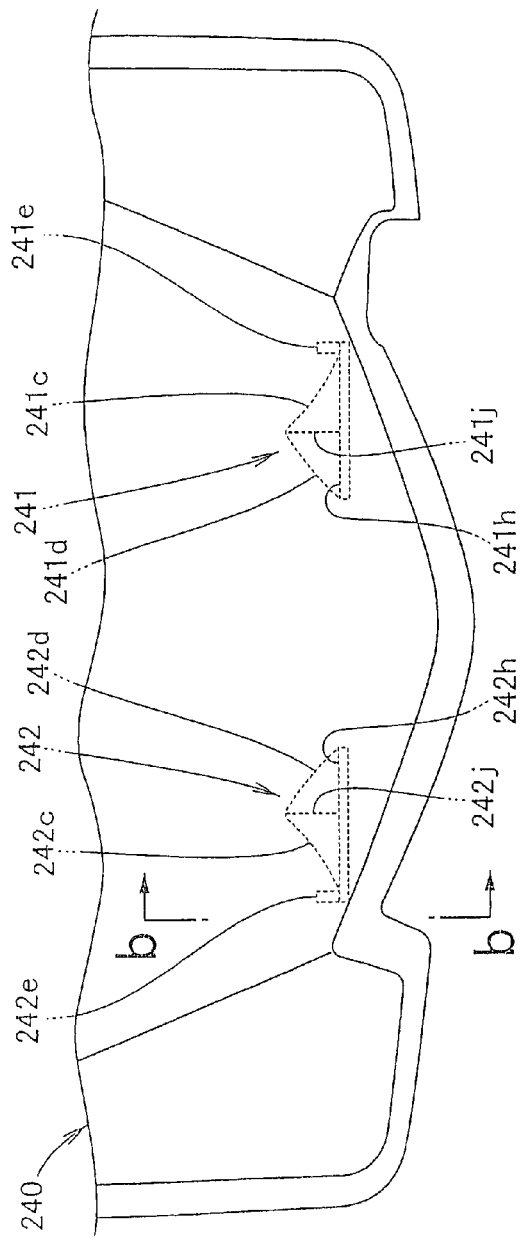
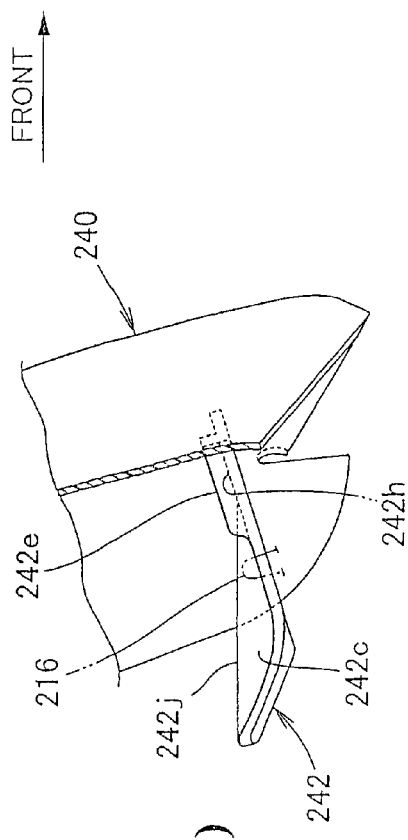
FIG. 12(a)
FIG. 12(b)

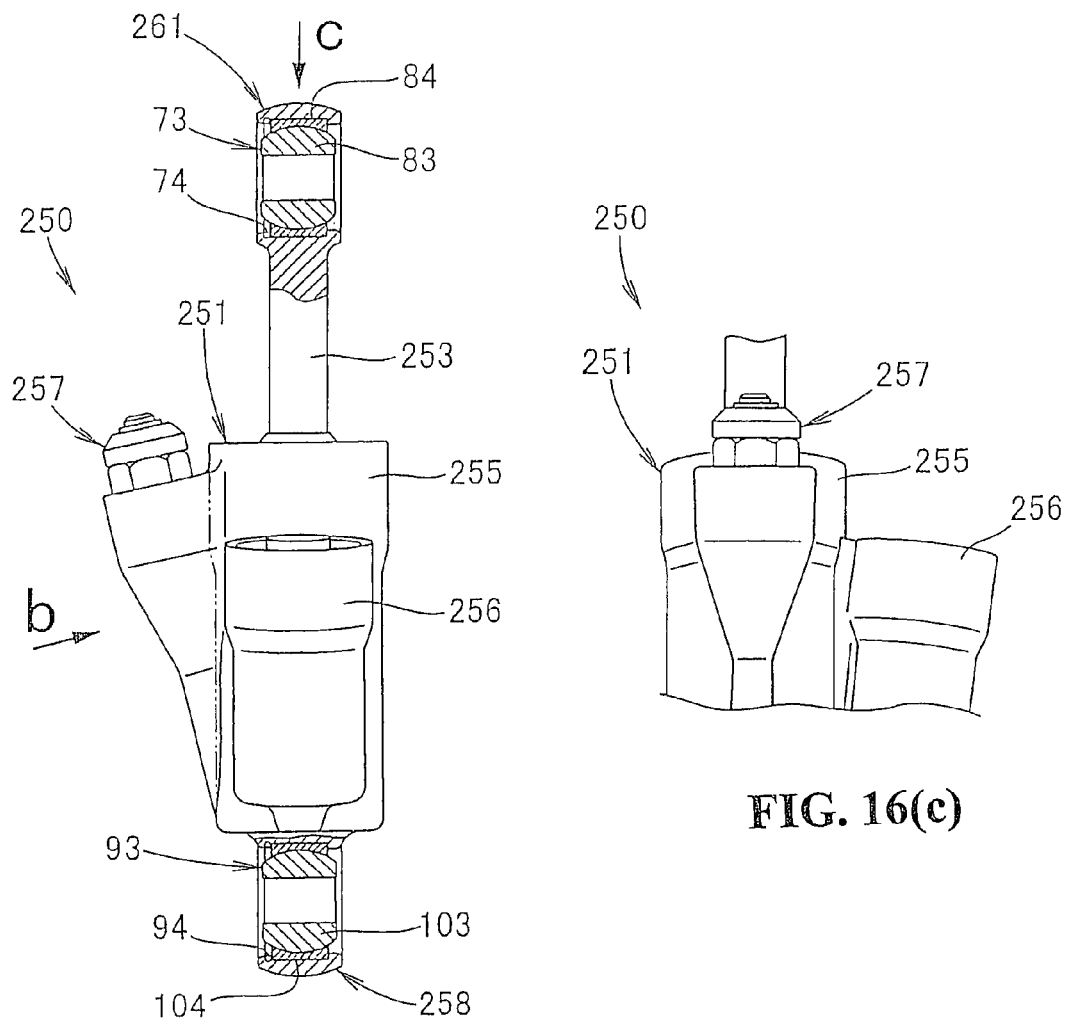
FIG. 16(c)
FIG. 16(a)
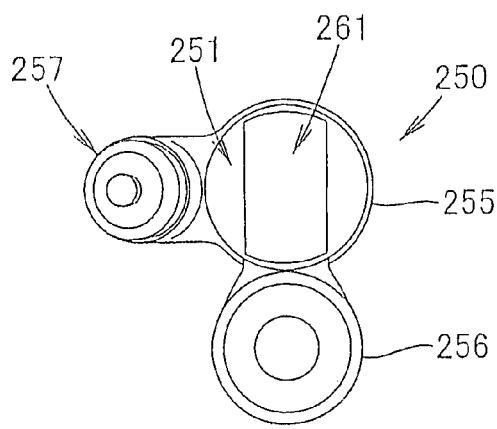
FIG. 16(b)

VEHICULAR NUMBER PLATE

CROSS-REFERENCE TO RELATED APPLICATION

The present application claims priority under 35 U.S.C. §119 to Japanese Patent Application No. 2006-203640, filed Jul. 26, 2006, and Japanese Patent Application No. 2007-118565, filed Apr. 27, 2007, the entire contents of which are hereby incorporated by reference.

BACKGROUND OF THE INVENTION

1. Field of the Invention

The present invention relates generally to number plates marked with competition identification numbers and, more particularly, to an improved number plate mounted on a vehicle including a steering damper that lessens a steering directional force suddenly transmitted to a handlebar via a front wheel and a front fork from a road surface.

2. Description of Background Art

A known vehicle has a steering damper disposed between a side of a vehicle body frame and a side of a front fork supporting a front wheel (see, for example, Japanese Patent Laid-Open No. 2005-96735.

FIGS. 1 and 2 of Japanese Patent Laid-Open No. 2005-96735 will be described below.

A front wheel 1 is mounted at a lower end of a front fork 2. The front fork 2 is steerably mounted to a head pipe 6h disposed at a front end of a vehicle body frame 6. The front fork 2 includes a pair of left and right fork pipes 3, 3, a fork bridge 4 connecting the fork pipes 3, 3, and a steering stem 5 mounted on the fork bridge 4.

The steering stem 5 is disposed across a top bridge 4a and a bottom bridge 4b that make up the fork bridge 4. The steering stem 5 is rotatably mounted on the head pipe 6h.

A tubular damper 10 forming the steering damper has a first end mounted on the head pipe 6h and a second end mounted on the bottom bridge 4b.

If a number plate is to be fitted at an upper portion of the front fork 2 of the above-referenced vehicle in order to take part in a competition, the number plate must be disposed further forward of the tubular damper 10, since the tubular damper 10 is disposed forward of the head pipe 6h. This results in the number plate being disposed substantially away forward of the head pipe 6h. As a result, the number plate tends to be subjected to cross wind, becoming more susceptible to an effect of the cross wind.

It is possible to modify the shape of the number plate so that the effect of the cross wind may be reduced. The number plate does not, however, function properly, if the modification results in a smaller area allowable for marking the identification number on the number plate. If the number plate is brought near to the head pipe 6h, it then becomes necessary to prevent the number plate from interfering with the tubular damper 10.

SUMMARY AND OBJECTS OF THE INVENTION

It is an object of the present invention to provide a number plate that allows the steering damper to be disposed without impairing normal functions of the number plate and that is less susceptible to the effect of cross wind.

To achieve the foregoing object, according to a first aspect of the present invention, a vehicle includes a front fork, a steering mechanism, and a number plate. Specifically, the front fork, which suspends a front wheel, is disposed steerably on a head pipe on a vehicle body side. The steering mechanism includes a handlebar mounted on a front fork. The number plate, which is marked with a competition identification number, is disposed at a front portion of a fork bridge that includes a top bridge and a bottom bridge to connect left- and right-hand portions of the front fork. In this vehicle, the steering damper is disposed between the head pipe and the bottom bridge. The number plate includes a protruded portion that protrudes forwardly at a center thereof and narrows toward a bottom thereof. Further, the number plate has a lower portion of the protruded portion covering an area forward of the steering damper.

The number plate includes the protruded portion that protrudes forwardly at the center thereof and narrows toward the bottom thereof. This secures, at a lower portion of the number plate, a space rearward thereof for accommodating the steering damper. There is also formed a wide area for marking the identification number thereon at an upper portion of the number plate.

The protruded portion at the lower portion of the number plate is a downward-pointing taper, which allows the protruded portion to be small and the flat portions to be secured on both sides of the protruded portion. There is no steering damper existing behind the upper portion of the number plate, so that the upper portion of the number plate can be disposed near the head pipe.

According to a second aspect of the present invention, the front fork of the vehicle, which suspends a front wheel, is disposed steerably on a head pipe on a vehicle body side. The steering mechanism includes a handlebar mounted on a front fork. The number plate, which is marked with a competition identification number, is disposed at a front portion of a fork bridge that includes a top bridge and a bottom bridge to connect left- and right-hand portions of the front fork. In this vehicle, the steering damper is disposed between the head pipe and the top bridge. The number plate includes a protruded portion that protrudes forwardly at a center thereof and narrows toward a top thereof. Further, the number plate has an upper portion of the protruded portion covering an area forward of the steering damper.

The number plate includes the protruded portion that protrudes forwardly at the center thereof and narrows toward the top thereof. This secures, at an upper portion of the number plate, a space rearward thereof for accommodating the steering damper. There is also formed a wide area for marking the identification number thereon at a lower portion of the number plate.

The protruded portion at the upper portion of the number plate is an upward-pointing taper, which allows the protruded portion to be small and the flat portions to be secured on both sides of the protruded portion. There is no steering damper existing behind the lower portion of the number plate, so that the lower portion of the number plate can be disposed near the head pipe.

According to a third aspect of the present invention, the steering damper includes a tubular body, a piston movably inserted in a cylinder hole formed in the body, and a piston rod attached to the piston. A body side mounting portion formed in the body is mounted on the head pipe and a first member of the fork bridge. Further, a rod side mounting portion formed on an end of the piston rod is mounted to the head pipe and a second member of the fork bridge.

When the front wheel is turned with the handlebar, the fork bridge rotates relative to the head pipe. As the piston moves inside the cylinder hole as a result of relative movement of the body and the end of the piston rod, a damping force is generated in the steering damper.

According to a fourth aspect of the present invention, the steering damper body includes a second cylinder hole communicating with the cylinder hole and a damping force adjustment mechanism adjusting a damping force by varying a flow rate of a hydraulic fluid circulating through the cylinder hole.

The damping force of the steering damper can therefore be easily adjusted with the damping force adjustment mechanism.

According to a fifth aspect of the present invention, the cylinder hole, the second cylinder hole, and the damping force adjustment mechanism are disposed in line in a vehicle width direction.

Accordingly, the steering damper can be made narrow in a longitudinal direction. As a result, protrusion of the protruded portion of the number plate toward the front of the vehicle can be kept small.

According to a sixth aspect of the present invention, the number plate includes a lower mounting tab disposed on a backside thereof. The lower mounting tab functions to mount the number plate to the bottom bridge. The lower mounting tab extends rearwardly from the backside of the number plate and includes an inclined surface, which is inclined in the vehicle width direction, disposed on an upper surface thereof.

Accordingly, gravel, mud, or the like, should it ride on the inclined surface included in the upper surface of the lower mounting tab of the number plate, gravel, mud, or the like are easy to fall off the inclined surface.

EFFECTS OF THE INVENTION

In accordance with the first aspect of the present invention, the steering damper is disposed between the head pipe and the bottom bridge, and the number plate has the protruded portion, which protrudes forwardly and narrows toward the bottom thereof, disposed at the center thereof. Further, the number plate has the lower portion of the protruded portion covering the area forward of the steering damper. These arrangements allow the protruded portion shaped into the downward-pointing taper to secure, at a lower portion of the number plate, a space rearward thereof for the steering damper to rotate when the handlebar is turned. Meantime, the arrangements allow an upper portion of the number plate to offer a wide area for marking the identification number thereon. The steering damper can thus be disposed without impairing the function of the number plate.

Forming the protruded portion into the downward-pointing taper allows the flat portions to be formed on both sides of the taper. Further, there is no steering damper existing behind the upper portion of the number plate. This allows the upper portion of the number plate to be even closer to the head pipe. This reduces a portion of the number plate protruding largely toward the front of the vehicle from the front fork, which helps lessen the effect of cross wind on the vehicle.

In accordance with the second aspect of the present invention, the steering damper is disposed between the head pipe and the top bridge, and the number plate has the protruded portion, which protrudes forwardly and narrows toward the top thereof, disposed at the center thereof. Further, the number plate has the upper portion of the protruded portion covering the area forward of the steering damper. These arrangements allow the protruded portion shaped into the upward-pointing taper to secure, at an upper portion of the number plate, a space rearward thereof for the steering damper to rotate when the handlebar is turned. Meantime, the arrangements allow a lower portion of the number plate to offer a wide area for marking the identification number thereon. The steering damper can thus be disposed without impairing the function of the number plate.

Forming the protruded portion into the upward-pointing taper allows the flat portions to be formed on both sides of the taper. Further, there is no steering damper existing behind the upper portion of the number plate. This allows the lower portion of the number plate to be even closer to the head pipe. This reduces a portion of the number plate protruding largely toward the front of the vehicle from the front fork, which helps lessen the effect of cross wind on the vehicle.

In accordance with the third aspect of the present invention, the steering damper includes the tubular body, the piston movably inserted in the cylinder hole formed in the body, and the piston rod attached to the piston. The body side mounting portion formed in the body is mounted on the head pipe and a first member of the fork bridge. Further, the rod side mounting portion formed on an end of the piston rod is mounted to the head pipe and a second member of the fork bridge. This arrangement allows the steering damper to be made long vertically. Even if the steering damper is swung to the left and right during operation of the handlebar, the range of swing movement of the steering damper can be kept small. As a result, the area of the protruded portion of the number plate can be made even smaller.

In accordance with the fourth aspect of the present invention, the steering damper body includes the second cylinder hole communicating with the cylinder hole and the damping force adjustment mechanism adjusting the damping force by varying the flow rate of the hydraulic fluid circulating through the cylinder hole. This arrangement allows the damping force of the steering damper to be adjusted easily with the damping force adjustment mechanism, contributing to an enhanced ease of use.

In accordance with the fifth aspect of the present invention, the cylinder hole, the second cylinder hole, and the damping force adjustment mechanism are disposed in line in the vehicle width direction. This arrangement allows the steering damper to be narrow in a longitudinal direction. As a result, protrusion of the protruded portion of the number plate toward the front of the vehicle can be kept small.

According to the sixth aspect of the present invention, the number plate includes a lower mounting tab disposed on a backside thereof. The lower mounting tab functions to mount the number plate to the bottom bridge. The lower mounting tab extends rearwardly from the backside of the number plate and includes an inclined surface, which is inclined in the vehicle width direction, disposed on an upper surface thereof. Accordingly, gravel, mud, or the like, should it ride on the inclined surface included in the upper surface of the lower mounting tab of the number plate, is easy to fall off the inclined surface. As a result, operation of the handle can be carried out smoothly.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 12(a) and 12(b) are views for illustrating the lower mounting tabs according to an embodiment of the present invention;

FIGS. 16(a) through 16(c) are views for illustrating the steering damper according to still another embodiment of the present invention.

DETAILED DESCRIPTION OF THE PREFERRED EMBODIMENTS

Figure 1:
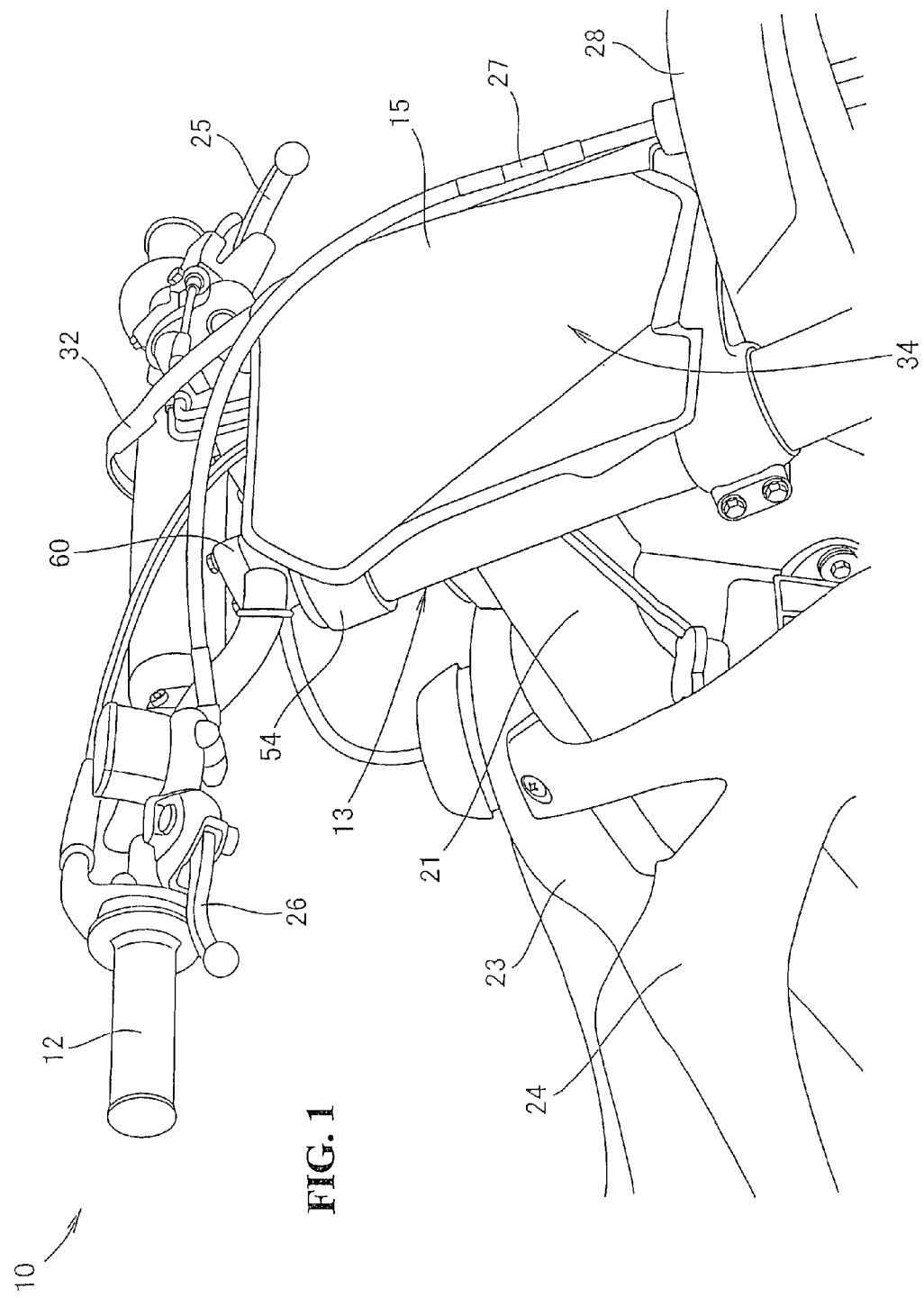
FIG. 1 is a perspective view showing a front portion of a vehicle having a number plate according to an embodiment of the present invention.

FIG. 1 is a perspective view showing a front portion of a vehicle having a number plate according to an embodiment of the present invention. A vehicle 10 is an offroad motorcycle. A handlebar 12 is fitted to an upper end of a front fork 13 that supports a front wheel at a lower end thereof. A number plate 15 marked with a competition identification number is mounted on an upper portion of the front fork 13.

Referring to FIG. 1, reference numeral 21 represents a vehicle body frame serving as a framework for the vehicle 10. The front fork 13 is steerably mounted at a front end of the vehicle body frame 21.

Also shown are a fuel tank 23 mounted at an upper portion of the vehicle body frame 21, a cowl 24 that covers a front side portion of a vehicle body, a clutch lever 25, 26 and a front wheel brake lever, respectively, attached to the handlebar 12. A brake hose 27 transmits an operating force applied to the front wheel brake lever 26 to a brake caliper disposed on a side of the front wheel as brake hydraulic pressure. Front fender 28 covers an area upward of the front wheel.

Figure 2:
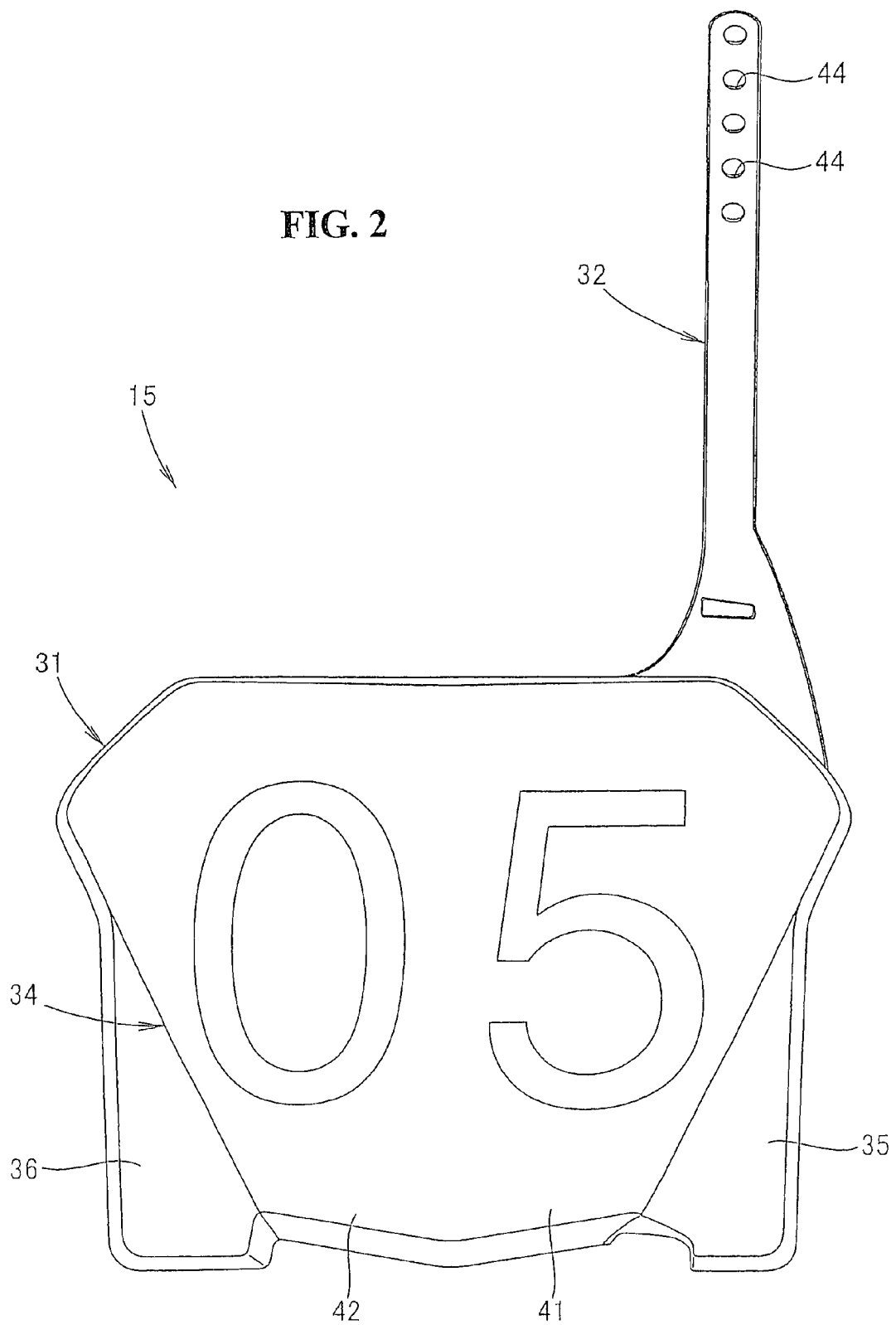
FIG. 2 is a front view showing the number plate according to an embodiment of the present invention.

FIG. 2 is a front view showing the number plate according to an embodiment of the present invention. The number plate 15 is formed of resin. The number plate 15 includes a main body portion 31 and an extended portion 32. The main body portion 31 is marked with an identification number (shown in FIG. 2 is "05"). The extended portion 32 extends integrally from an upper end portion of the main body portion 31.

The extended portion 32 is wound around the handlebar 12. FIG. 2 illustrates a plurality of fixing holes 44 used for winding and fixing the extended portion 32 around the handlebar 12.

The main body portion 31 includes a protruded portion 34 and flat portions 35, 36. The protruded portion 34 has a wider upper portion and a narrower lower portion, being shaped into a downward-pointing taper. The flat portions 35, 36 are formed integrally on either side on the lower portion of the protruded portion 34. The protruded portion 34 and the flat portions 35, 36 are in an identical plane.

The protruded portion 34 includes inclined portions 41, 42 that gradually retreat toward left and right sides away from a center of the protruded portion 34.

Figure 3:
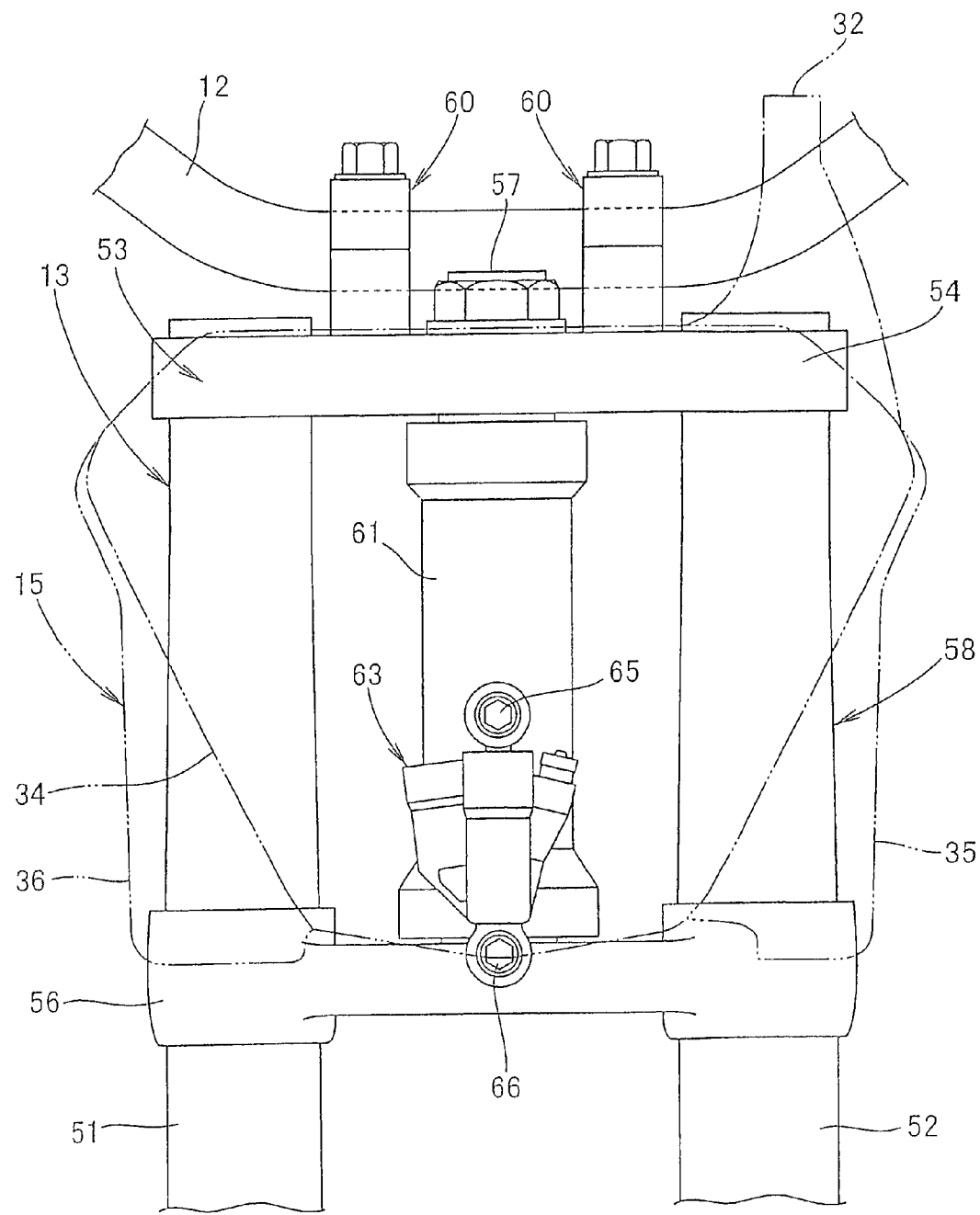
FIG. 3 is a view for illustrating a front portion of the vehicle according to an embodiment of the present invention.

FIG. 3 is a view for illustrating a front portion of the vehicle according to an embodiment of the present invention. The front fork 13 includes a pair of left and right fork pipes 51, 52, a fork bridge 53, and a steering stem 57. The front wheel is mounted to lower ends of the fork pipes 51, 52 via an axle. The fork bridge 53 connects upper portions of the fork pipes 51, 52. The fork bridge 53 includes a top bridge 54 and a bottom bridge 56 formed of an aluminum alloy. The steering stem 57, which serves as a pivot, is extended across a central portion of each of the top bridge 54 and the bottom bridge 56. The top bridge 54 includes a pair of left and right handlebar dampers 60, 60 disposed thereon. The handlebar dampers 60, 60 support the handlebar 12.

The steering stem 57 is rotatably mounted on a head pipe 61 disposed at a front end of the vehicle body frame 21 (see FIG. 1).

The front fork 13, the handlebar 12 (see FIG. 1), and the head pipe 61 described above constitute a steering mechanism 58 for steering the front wheel.

A steering damper 63 is mounted with bolts 65, 66 between the head pipe 61 and the bottom bridge 56. The steering damper 63 serves as a shock absorber that lessens a steering directional force suddenly transmitted to the front fork 13 and the handlebar 12 from a road surface via the front wheel.

The lower portion of the protruded portion 34 as the downward-pointing taper of the number plate 15 is disposed forward of the steering damper 63.

Figure 4:
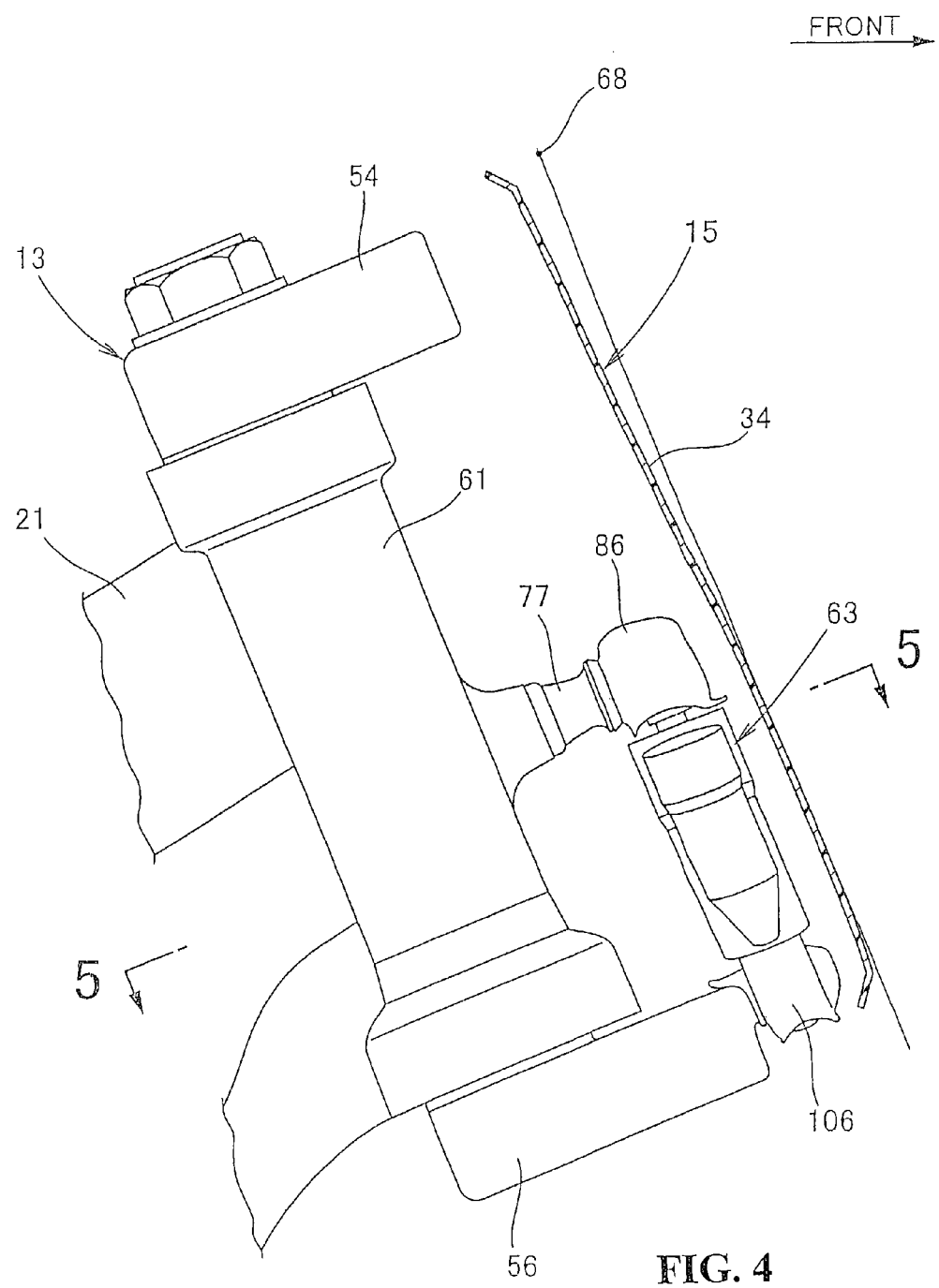
FIG. 4 is a side elevational view showing the front portion of the vehicle according to an embodiment of the present invention.

FIG. 4 is a side elevational view (an arrow FRONT in FIG. 4 indicates a forward direction of the vehicle; same applies hereunder) showing the front portion of the vehicle according to an embodiment of the present invention. FIG. 4 shows that the number plate 15 (shown herein as a cross section) is disposed so as to cover an area forward of the front fork 13 from the top bridge 54 to the bottom bridge 56 and an area forward of the steering damper 63. In FIG. 4, reference numeral 68 represents a straight line tangent to the number plate 15 and in parallel with an axis of the head pipe 61.

The lower portion of the protruded portion 34 of the number plate 15 is disposed so as not to interfere with a range of movement of the steering damper 63 moved as a result of rotation of the front fork 13 when the front wheel is steered with the handlebar 12 (see FIG. 1), more specifically, a range of movement of a lower portion side (on a side of the bottom bridge 56) of the steering damper 63. An upper portion of the protruded portion 34 of the number plate 15 is closer to a side of the head pipe 61 than the lower portion (that is, away rearward from the straight line 68).

As such, the lower portion of the protruded portion 34 covers forward and sideward portions of the steering damper 63 so as not to interfere with a swingable range of the steering damper 63. Meanwhile, the upper portion of the protruded portion 34 can be disposed closer to the head pipe 61 for lack of the steering damper 63.

More specifically, when the number plate 15 is to be mounted to the front fork 13, the number plate 15 is protruded in a portion corresponding to the swingable range of the steering damper 63 and is less protruded from the front fork 13 in other portions corresponding to the upper portion and the flat portions 35, 36 (see FIG. 2) of the number plate 15. This helps minimize the protruded portion of the number plate 15 from the head pipe 61, which helps lessen the effect of cross wind blowing against the number plate 15.

Figure 5:
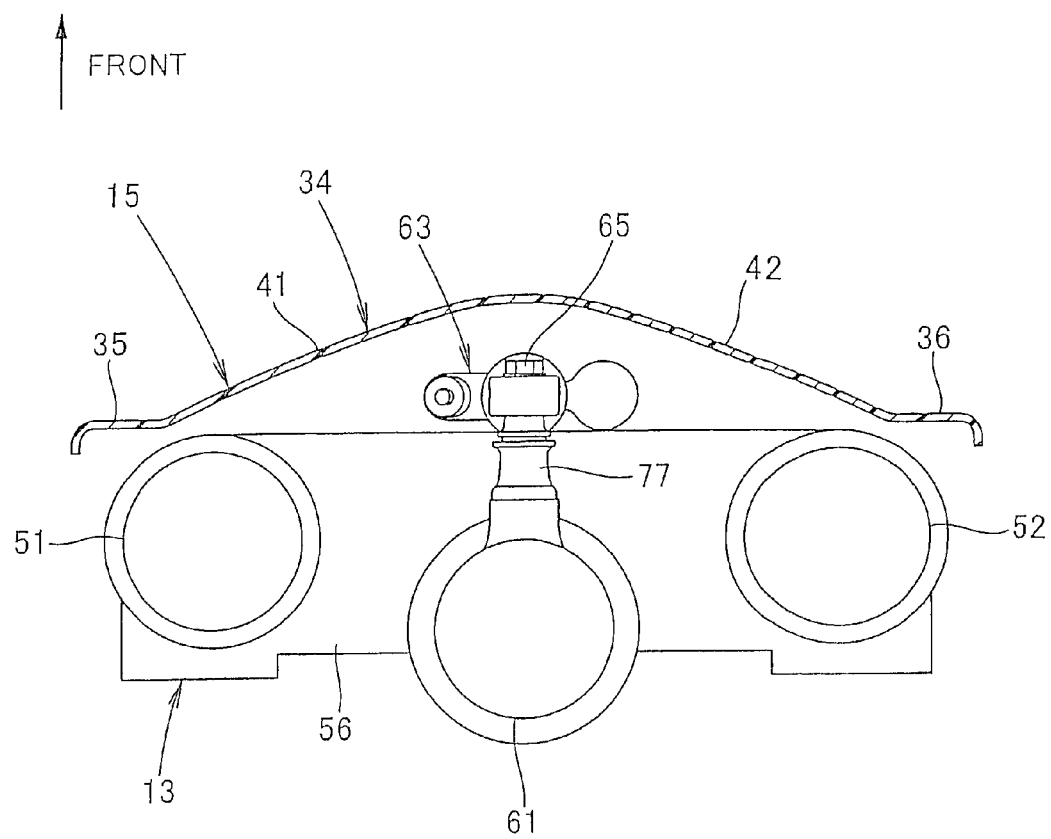
FIG. 5 is a cross-sectional view taken along line 5-5 of FIG. 4.

FIG. 5 is a cross-sectional view taken along line 5-5 of FIG. 4. FIG. 5 shows that the steering damper 63 is mounted to the head pipe 61 via a collar 77 and the number plate 15, specifically, the protruded portion 34 thereof is disposed forward of the steering damper 63.

The protruded portion 34 includes the inclined portions 41, 42 that extend sideways and obliquely rearwardly. An end of each of the inclined portions 41, 42 integrally connects to a corresponding one of the flat portions 35, 36. An end of each of the flat portions 35, 36 is bent rearwardly.

Accordingly, the steering damper 63 is covered with the number plate 15 at forward and sideward areas thereof.

Figure 6:
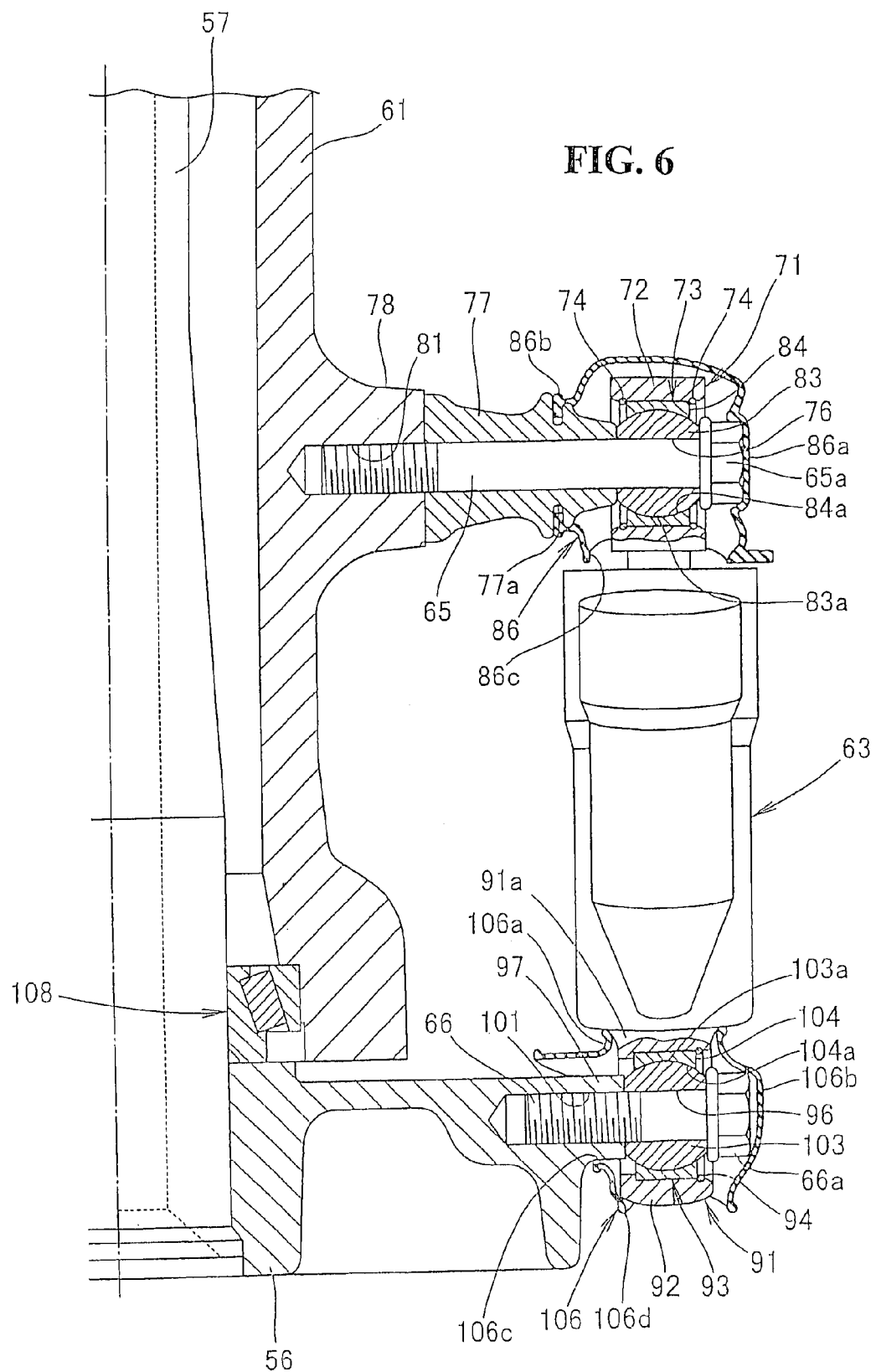
FIG. 6 is a cross-sectional view showing an arrangement for mounting the steering damper according to an embodiment of the present invention.

FIG. 6 is a cross-sectional view (partly side elevational view) showing an arrangement for mounting the steering damper according to an embodiment of the present invention. An upper mounting portion 71 for the steering damper 63 mounted to the head pipe 61 includes an upper annular portion 72, a spherical plain bearing 73, and snap rings 74, 74. Specifically, the spherical plain bearing 73 is fitted in the upper annular portion 72. The snap rings 74, 74 secure the spherical plain bearing 73 in the upper mounting portion 71. The upper mounting portion 71 is attached to a boss portion 78 formed in the head pipe 61 via the collar 77 using the bolt 65 inserted in a bolt insertion hole 76 formed in the spherical plain bearing 73. In FIG. 6, reference numeral 81 represents internal threads formed in the boss portion 78, in which the bolt 65 is screwed.

The spherical plain bearing 73 includes an inner ring 83 and an outer ring 84. Specifically, the inner ring 83 includes an outer surface 83a, on which part of a convex spherical surface is formed. The outer ring 84 includes an inner surface 84a, on which part of a concave spherical surface slidably fitted in the outer surface 83a of the inner ring 83 is formed. The inner ring 83 includes the bolt insertion hole 76 and the outer ring 84 is fitted in the upper annular portion 72.

The aforementioned upper mounting portion 71, a head 65a of the bolt 65, and part of the collar 77 are covered with an upper boot 86 formed of rubber.

The upper boot 86 includes a bolt fitting portion 86a, a hole-like fitting portion 86b, and an opening 86c. Specifically, the bolt fitting portion 86a is fitted in the head 65a of the bolt 65. The hole-like fitting portion 86b is fitted in an annular groove 77a formed in the collar 77. The opening 86c is for draining water. The upper boot 86 protects the upper mounting portion 71 from rainwater, dust, and the like. Should rainwater get in the upper boot 86, the water is discharged through the opening 86c.

A lower mounting portion 91 for the steering damper 63 is mounted to the bottom bridge 56. The lower mounting portion 91 includes a lower annular portion 92, a spherical plain bearing 93, and a snap ring 94. Specifically, the spherical plain bearing 93 is fitted in the lower annular portion 92. The snap ring 94 secures the spherical plain bearing 93 in the lower mounting portion 91. The lower mounting portion 91 is attached to a lower mounting portion 97 formed in the bottom bridge 56 using the bolt 66 inserted in a bolt insertion hole 96 formed in the spherical plain bearing 93. In FIG. 6, reference numeral 101 represents internal threads formed in the lower mounting portion 97, into which the bolt 66 is screwed.

The spherical plain bearing 93 includes an inner ring 103 and an outer ring 104. Specifically, the inner ring 103 includes an outer surface 103a, on which part of a convex spherical surface is formed. The outer ring 104 includes an inner surface 104a, on which part of a concave spherical surface slidably fitted in the outer surface 103a of the inner ring 103 is formed. The inner ring 103 includes the bolt insertion hole 96 and the outer ring 104 is fitted in the lower annular portion 92.

The aforementioned lower mounting portion 91, a head 66a of the bolt 66, and part of the lower mounting portion 97 are covered with a lower boot 106 formed of rubber.

The lower boot 106 includes a root fitting portion 106a, a head abut portion 106b, a side opening 106c, and a lower opening 106d. Specifically, the root fitting portion 106a is fitted in a root 91a of the lower mounting portion 91. The head abut portion 106b is abutted against the head 66a of the bolt 66. The side opening 106c is open so as to circumvent the lower mounting portion 97. The lower opening 106d formed in a lower portion is for draining water. The lower boot 106 protects the lower mounting portion 91 from rainwater, dust, and the like. Should rainwater get in the lower boot 106, the water is discharged through the lower opening 106d.

In FIG. 6, reference numeral 108 represents a taper roller bearing disposed between the steering stem 57 and the head pipe 61.

Figure 7:
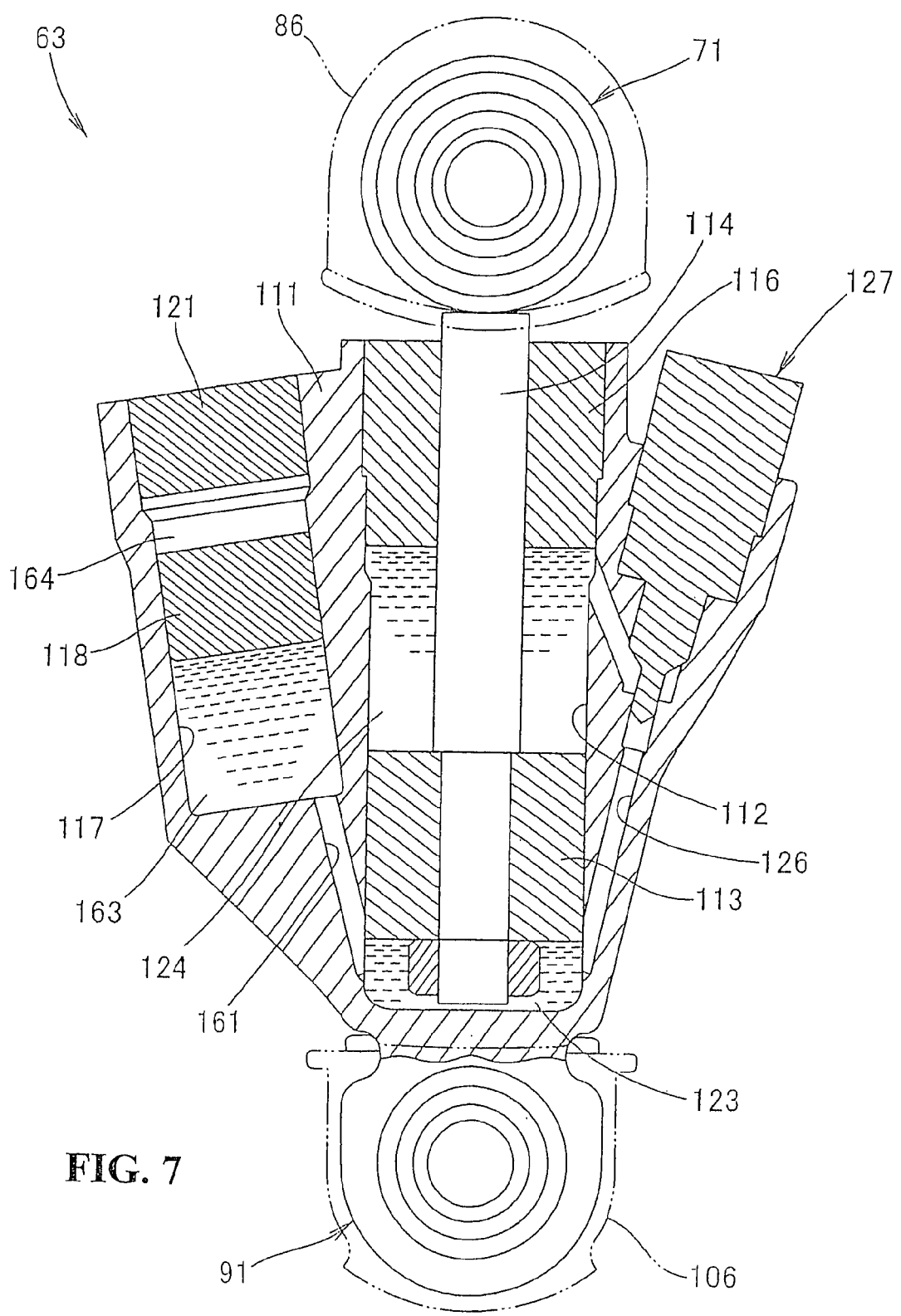
FIG. 7 is a schematic view showing the steering damper according to an embodiment of the present invention.

FIG. 7 is a schematic view showing the steering damper 63 according to an embodiment of the present invention. The steering damper 63 includes a body 111, a piston 113, a piston rod 114, a first cylinder end hermetic sealing portion 116, a free piston 118, a second cylinder end hermetic sealing portion 121, a flow rate adjustment mechanism 127, and the upper mounting portion 71. The body 111 includes a plurality of tubes. The piston 113 is movably inserted in a first cylinder hole 112 formed in the body 111. The piston rod 114 is attached to the piston 113. The first cylinder end hermetic sealing portion 116 is fitted slidably in the piston rod 114 and closes an opening of the first cylinder hole 112. The free piston 118 is movably inserted in a second cylinder hole 117 formed in the body 111. The second cylinder end hermetic sealing portion 121 closes an opening of the second cylinder hole 117. The flow rate adjustment mechanism 127 varies a damping force of the steering damper 63 by adjusting a flow rate of a hydraulic fluid flowing through a communication path 126 that provides fluid communication between a first hydraulic chamber 123 and a second hydraulic chamber 124 formed on both sides of the piston 113 in the first cylinder hole 112. The upper mounting portion 71 is mounted on an end of the piston rod 114. In FIG. 7, reference numeral 161 represents a communication hole providing communication between the first cylinder hole 112 and the second cylinder hole 117. A first chamber 163 and a second chamber 164, respectively, are formed on both sides of the free piston 118.

The above-referenced first hydraulic chamber 123, the second hydraulic chamber 124, and the first chamber 163 are filled with hydraulic fluid, while the second chamber 164 is filled with air.

As shown in FIGS. 3 and 7, in accordance with an embodiment of the present invention, the steering damper 63 is adapted to include the tubular body 111, the piston 113 movably inserted in the first cylinder hole 112 formed in the body 111, and the piston rod 114 attached to the piston 113. The lower mounting portion 91 formed on the body 111 as a body side mounting portion is mounted on the head pipe 61 and a first member of the fork bridge 53. The upper mounting portion 71 formed on the end of the piston rod 114 as a rod side mounting portion is mounted on the head pipe 61 and a second member of the fork bridge 53.

This arrangement allows the steering damper 63 to be made long vertically. Even if the steering damper 63 is swung to the left and right during operation of the handlebar 12, the range of swing movement of the steering damper 63 can be kept small. As a result, the area of the protruded portion 34 of the number plate 15 can be made even smaller.

According to an embodiment of the present invention, the body 111 of the steering damper 63 includes the second cylinder hole 117 that communicates with the first cylinder hole 112 and the flow rate adjustment mechanism 127 that serves as a damping force adjustment mechanism adjusting the damping force by varying the flow rate of the hydraulic fluid circulating through the first cylinder hole 112.

This arrangement allows the damping force of the steering damper 63 to be adjusted easily with the flow rate adjustment mechanism 127, contributing to an enhanced ease of use.

Further, according to an embodiment of the present invention, the first cylinder hole 112, the second cylinder hole 117, and the flow rate adjustment mechanism 127 are disposed in line in the vehicle width direction.

This arrangement allows the steering damper 63 to be narrow in a longitudinal direction as shown in FIG. 5. As a result, protrusion of the protruded portion 34 of the number plate 15 toward the front of the vehicle can be kept small.

Figure 8:
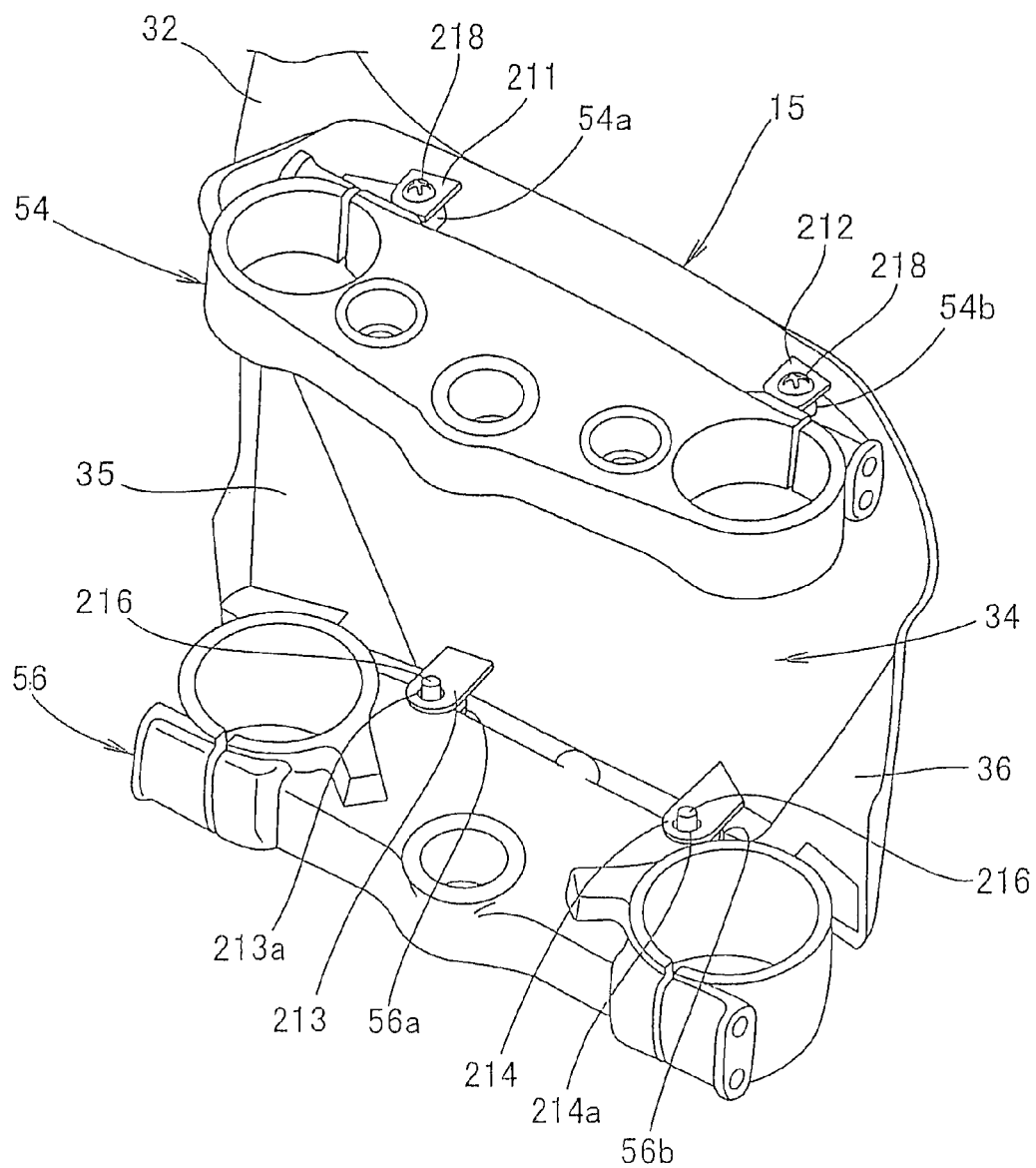
FIG. 8 is a perspective view showing a mounting structure for the number plate according to an embodiment of the present invention.

FIG. 8 is a perspective view showing a mounting structure for the number plate according to an embodiment of the present invention. The number plate 15 includes a pair of left and right upper mounting tabs 211, 212 and a pair of left and right lower mounting tabs 213, 214 integrally formed on a backside thereof. The upper mounting tabs 211, 212 have mounting holes not shown drilled therein. The lower mounting tabs 213, 214 have mounting holes 213a, 214a drilled therein. The top bridge 54 has front protrusions 54a, 54b integrally formed on a front portion thereof. The bottom bridge 56 has front protrusions 56a, 56b integrally formed on a front portion thereof and mounting pins 216, 216 installed integrally in the front protrusions 56a, 56b.

The number plate 15 is installed through the following sequence. Specifically, the mounting pins 216, 216 of the bottom bridge 56 are fitted in the mounting holes 213a, 214a in the lower mounting tabs 213, 214 of the number plate 15. Screws 218, 218 are then passed through the mounting holes in the upper mounting tabs 211, 212 of the number plate 15. The screws 218, 218 are screwed into threaded holes (not shown) made in the front protrusions 54a, 54b. This completes mounting of the number plate 15 to the top bridge 54 and the bottom bridge 56.

As described above with reference to FIGS. 1 through 4, the present invention applies to the vehicle 10 that includes: the front fork 13, which suspends the front wheel, disposed steerably on the head pipe 61 on the vehicle body side; the steering mechanism 58 that includes the handlebar 12 mounted on the front fork 13; and the number plate 15, which is marked with a competition identification number, disposed at the front portion of the fork bridge 53 including the top bridge 54 and the bottom bridge 56 to connect the left- and right-hand portions of the front fork 13. In this vehicle 10, the steering damper 63 is disposed between the head pipe 61 and the bottom bridge 56. The number plate 15 includes the protruded portion 34 that protrudes forwardly at the center thereof and narrows toward the bottom thereof. Further, the number plate 15 has the lower portion of the protruded portion 34 covering the area forward of the steering damper 63.

The foregoing arrangements allow the protruded portion 34 shaped into the downward-pointing taper to secure, at a lower portion of the number plate 15, a space rearward thereof for the steering damper 63 to rotate when the handlebar 12 is turned. Meantime, the arrangements allow an upper portion of the number plate 15 to offer a wide area for marking the identification number thereon. The steering damper 63 can thus be disposed without impairing the function of the number plate 15.

Forming the protruded portion 34 into the downward-pointing taper allows the flat portions 35, 36 to be formed on both sides of the taper. Further, there is no steering damper 63 existing behind the upper portion of the number plate 15. This allows the upper portion of the number plate 15 to be even closer to the head pipe 61. This reduces a portion of the number plate 15 protruding largely toward the front of the vehicle from the front fork 13, which helps lessen the effect of cross wind on the vehicle 10.

Figure 9:
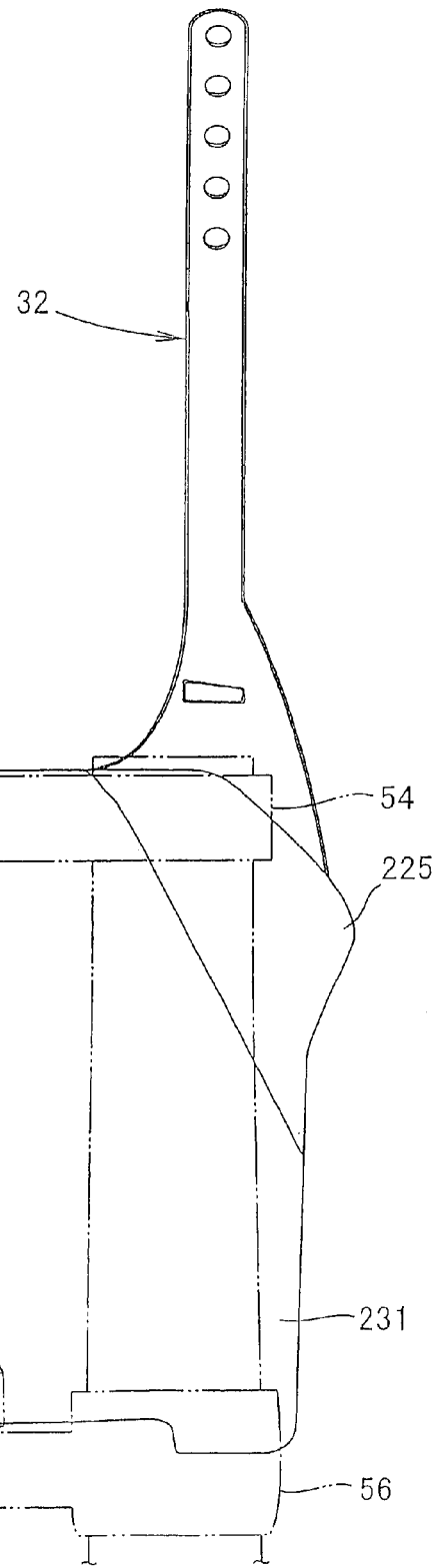
FIG. 9 is a front view showing a number plate according to another embodiment of the present invention.

FIG. 9 is a front view showing a number plate according to another embodiment of the present invention. For arrangements of the number plate according to the second embodiment of the present invention, like parts as those used in the arrangements according to the first embodiment of the present invention are identified by like reference numerals and detailed descriptions for the same will be omitted.

A number plate 221, formed from resin, includes a main body portion 222 and an extended portion 32. The main body portion 222 is marked with an identification number. The extended portion 32 extends integrally from an upper end portion of the main body portion 222. The number plate 221 is mounted to a top bridge 54 and a bottom bridge 56.

The main body portion 222 includes a protruded portion 224 and flat portions 225, 226. The protruded portion 224 has a wider lower portion and a narrower upper portion, being shaped into an upward-pointing taper. The flat portions 225, 226 are formed integrally on either side on the upper portion of the protruded portion 224.

The protruded portion 224 includes inclined surfaces 231, 232 that gradually retreat toward left and right sides at a center of the protruded portion 224.

A steering damper 63 is mounted between a head pipe 61 and the top bridge 54. The upper portion of the protruded portion 224, specifically the upward-pointing taper is disposed forward of the steering damper 63.

As described above, the upper portion of the protruded portion 224 covers areas forward and both sideways of the steering damper 63 so as not to interfere with a range of swingable movement of the steering damper 63. Further, there is no steering damper 63 existing in an area corresponding to the lower portion of the protruded portion 224. More specifically, when the number plate 221 is to be mounted to a front fork 13, the number plate 221 is protruded in a portion corresponding to the swingable range of the steering damper 63 and is less protruded from the front fork 13 in other portions corresponding to the lower portion and the flat portions 225, 226 of the number plate 221. This helps lessen the effect of cross wind blowing against the number plate 221.

As described above with reference to FIGS. 1 through 9, the present invention applies to the vehicle 10 that includes: the front fork 13, which suspends the front wheel, disposed steerably on the head pipe 61 on the vehicle body side; the steering mechanism 58 that includes the handlebar 12 mounted on the front fork 13; and the number plate 221, which is marked with a competition identification number, disposed at the front portion of the fork bridge 53 including the top bridge 54 and the bottom bridge 56 to connect the left- and right-hand portions of the front fork 13. In this vehicle 10, the steering damper 63 is disposed between the head pipe 61 and the top bridge 54. The number plate 221 includes the protruded portion 224 that protrudes forwardly at the center thereof and narrows toward the top thereof. Further, the number plate 221 has the upper portion of the protruded portion 224 covering the area forward of the steering damper 63.

The foregoing arrangements allow the protruded portion 224 shaped into the upward-pointing taper to secure, at an upper portion of the number plate 221, a space rearward thereof for the steering damper 63 to rotate when the handlebar 12 is turned. Meantime, the arrangements allow a lower portion of the number plate 221 to offer a wide area for marking the identification number thereon. The steering damper 63 can thus be disposed without impairing the function of the number plate 221.

Forming the protruded portion 224 into the upward-pointing taper allows the flat portions 225, 226 to be formed on both sides of the taper. Further, there is no steering damper 63 existing behind the lower portion of the number plate 221. This allows the lower portion of the number plate 221 to be even closer to the head pipe 61. This reduces a portion of the number plate 221 protruding largely toward the front of the vehicle from the front fork 13, which helps lessen the effect of cross wind on the vehicle 10.

Figure 10:
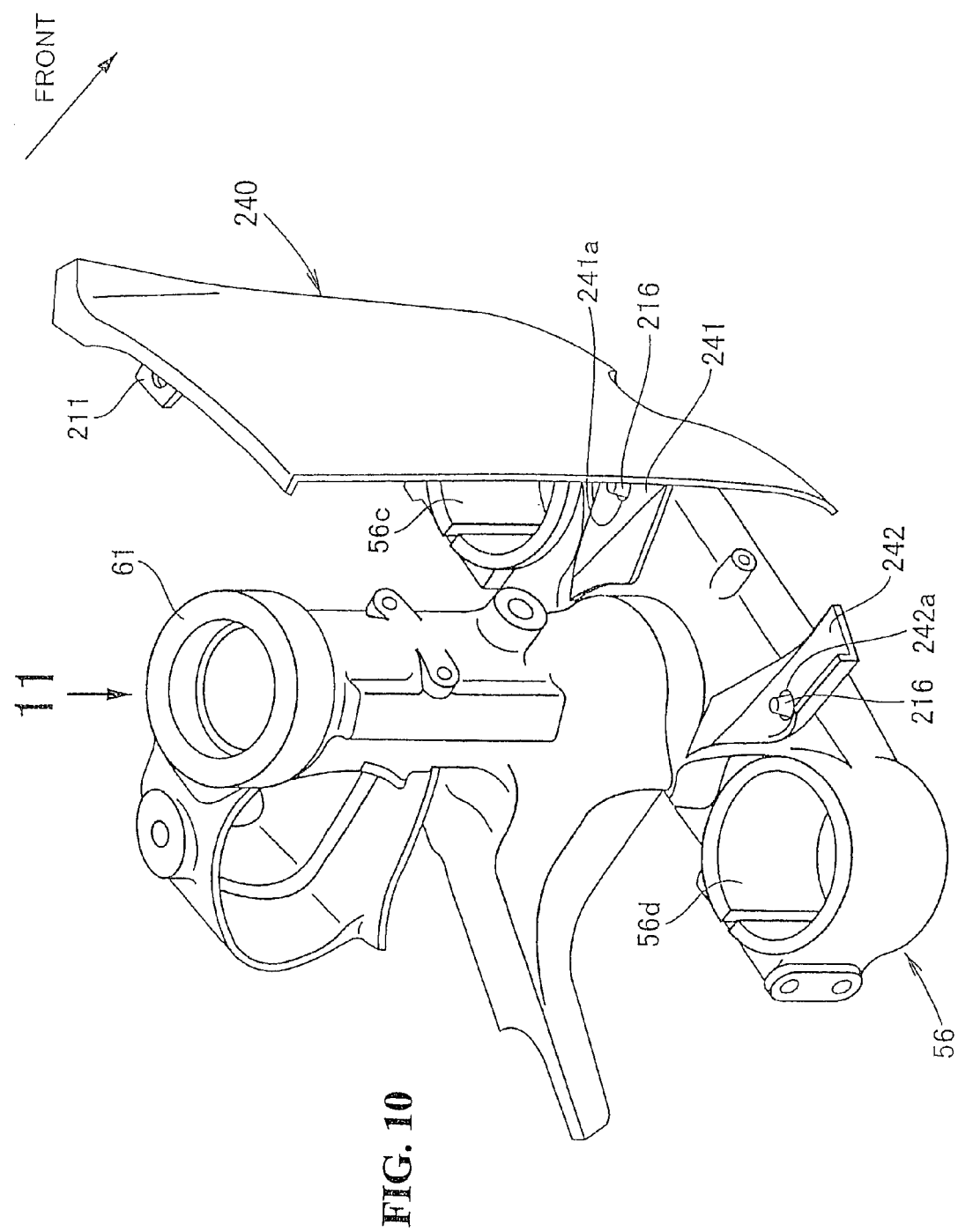
FIG. 10 is a perspective view showing a lower mounting tab of a number plate according to another embodiment of the present invention.

FIG. 10 is a perspective view showing a lower mounting tab of a number plate according to another embodiment of the present invention. For sake of explanation, descriptions of part of the number plate will be omitted.

A number plate 240 is integrated with a pair of left and right lower mounting tabs 241, 242 extending rearwardly for mounting the number plate 240 to the bottom bridge 56.

The lower mounting tabs 241, 242 include mounting holes 241a, 242a formed therein, respectively. The mounting pins 216, 216 of the bottom bridge 56 fit into the mounting holes 241a, 242a.

Figure 11:
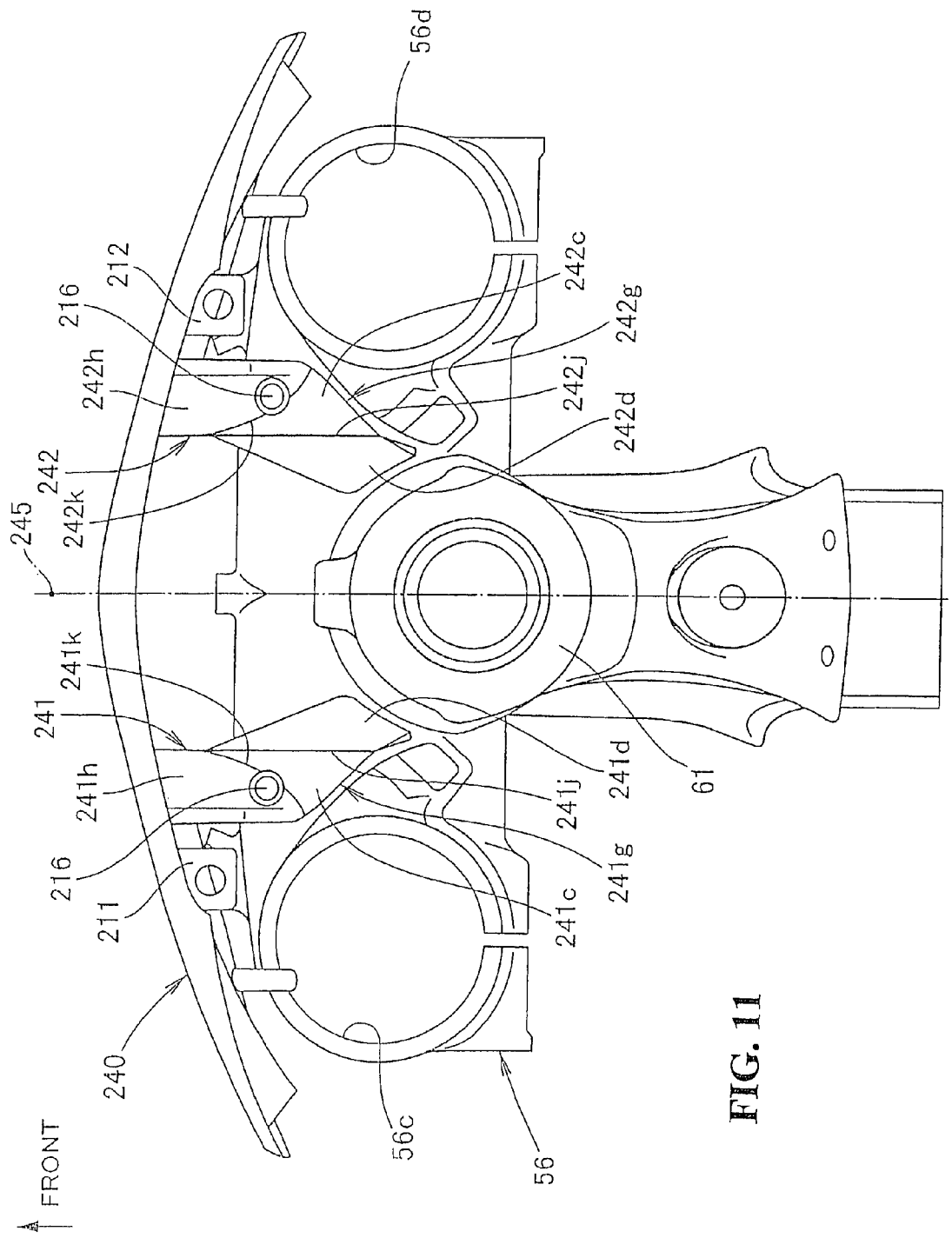
FIG. 11 is a view on arrow 11 of FIG. 10.

FIG. 11 is a view on arrow 11 of FIG. 10. The lower mounting tabs 241, 242 of the number plate 240 are symmetrical in shape relative to a vehicle body centerline 245 passing through a center in width and extending in the longitudinal direction of the vehicle. The lower mounting tabs 241, 242 extend rearwardly toward areas between the head pipe 61 and fork pipe insertion holes 56c, 56d made in the bottom bridge 56, through which the fork pipes 51, 52 (see FIG. 3) are passed. The lower mounting tabs 241, 242 are disposed inwardly in the vehicle width direction relative to the upper mounting tabs 211, 212.

FIGS. 12(a) and 12(b) are views for illustrating the lower mounting tabs according to an embodiment of the present invention.

FIG. 12(a) is a front view showing a principal portion of the number plate 240. Each of the lower mounting tabs 241, 242 is in the form of an angle in the front view, having an upper surface inclined in the vehicle width direction.

Specifically, the lower mounting tab 241 includes an outer inclined surface 241c and an inner inclined surface 241d. The outer inclined surface 241c descends from a peak of the angle toward an outside in the vehicle width direction. The inner inclined surface 241d descends from the peak toward an inside in the vehicle width direction. The lower mounting tab 242, on the other hand, includes an outer inclined surface 242c and an inner inclined surface 242d. The outer inclined surface 242c descends from a peak of the angle toward an outside in the vehicle width direction. The inner inclined surface 242d descends from the peak toward an inside in the vehicle width direction. In FIG. 12(a), reference numerals 241e, 242e represent standing walls formed on corresponding ends of the outer inclined surfaces 241c, 242c.

Referring back to FIG. 11, an upper surface 241g included in the lower mounting tab 241 includes the outer inclined surface 241c, the inner inclined surface 241d, and a flat surface 241h adjoining the outer inclined surface 241c. In FIG. 11, reference numeral 241j represents a boundary line passing through a boundary between the outer inclined surface 241c and the inner inclined surface 241d. Reference numeral 241k represents a boundary line passing through a boundary between the outer inclined surface 241c and the flat surface 241h.

An upper surface 242g included in the lower mounting tab 242 includes the outer inclined surface 242c, the inner inclined surface 242d, and a flat surface 242h adjoining the outer inclined surface 242c. FIG. 11 illustrates a boundary line 242j passing through a boundary between the outer inclined surface 242c and the inner inclined surface 242d. A boundary line 242k passes through a boundary between the outer inclined surface 242c and the flat surface 242h.

The flat surfaces 241h, 242h are mounted on an upper surface of the bottom bridge 56.

The bottom bridge 56 is inclined such that a rear portion thereof is lower than a front portion thereof because of a caster angle (an inclined angle relative to a perpendicular line of a centerline of the steering stem in a side view) involved. Accordingly, the flat surface 241h and the flat surface 242h are inclined in a similar manner. Similarly, the boundary lines 241j, 242j that extend substantially in parallel with the flat surfaces 241h, 242h are inclined.

FIG. 12(b) is a cross-sectional view taken along line b-b of FIG. 12(a). With the number plate 240 mounted in the vehicle, the boundary line 242j of the lower mounting tab 242 is, though inclined relative to the flat surface 242h, substantially horizontal.

Referring to FIGS. 12(a) and 12(b), the lower mounting tabs 241, 242 are formed widely, so that mud or the like is less likely to enter a space between the bottom bridge 56 and the number plate 240, downward of the lower mounting tabs 241, 242.

Additionally, the outer inclined surfaces 241c, 242c and the inner inclined surfaces 241d, 242d are formed on either side of the boundary lines 241j, 242j to form angled thick wall portions. Added stiffness is thereby given to the lower mounting tabs 241, 242. Further, interference with the steering damper is circumvented by forming the inner inclined surfaces 241d, 242d.

Figure 13:
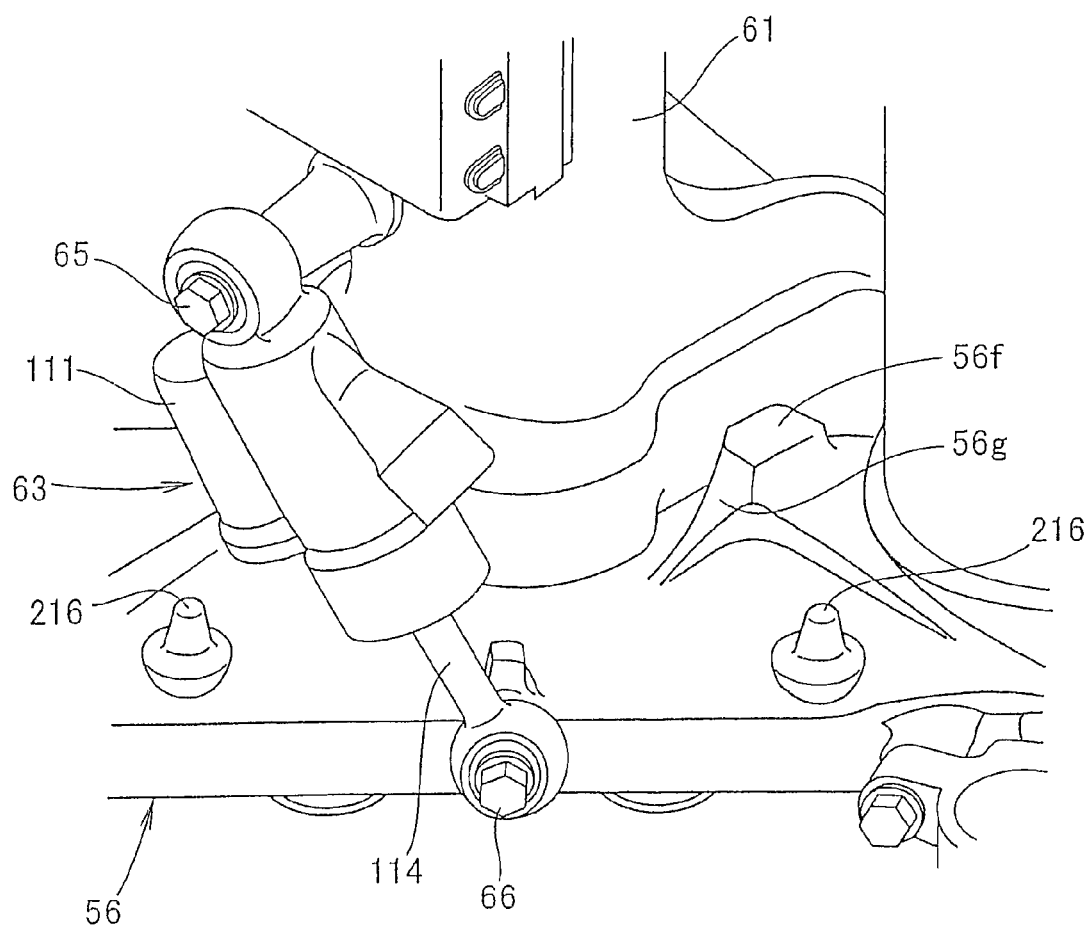
FIG. 13 is a perspective view showing a front portion of the vehicle according to an embodiment of the present invention.

FIG. 13 is a perspective view showing a front portion of the vehicle according to an embodiment of the present invention. A pair of left and right handlebar stoppers 56f, 56f (the stopper 56f on only one side is shown) is integrally formed on the upper surface of the bottom bridge 56. The handlebar stopper 56f contacts a lower portion of the head pipe 61 to restrict a steering angle of the handlebar. A rib 56g is integrally formed with each of the handlebar stoppers 56f, 56f. Integrally forming the rib 56g with the handlebar stopper 56f enhances stiffness of the handlebar stopper 56f.

In accordance with the above-mentioned embodiment of the present invention, the body 111 of the steering damper 63 is mounted to the head pipe 61, while the piston rod 114 of the steering damper 63 is mounted to the bottom bridge 56.

Figure 14:
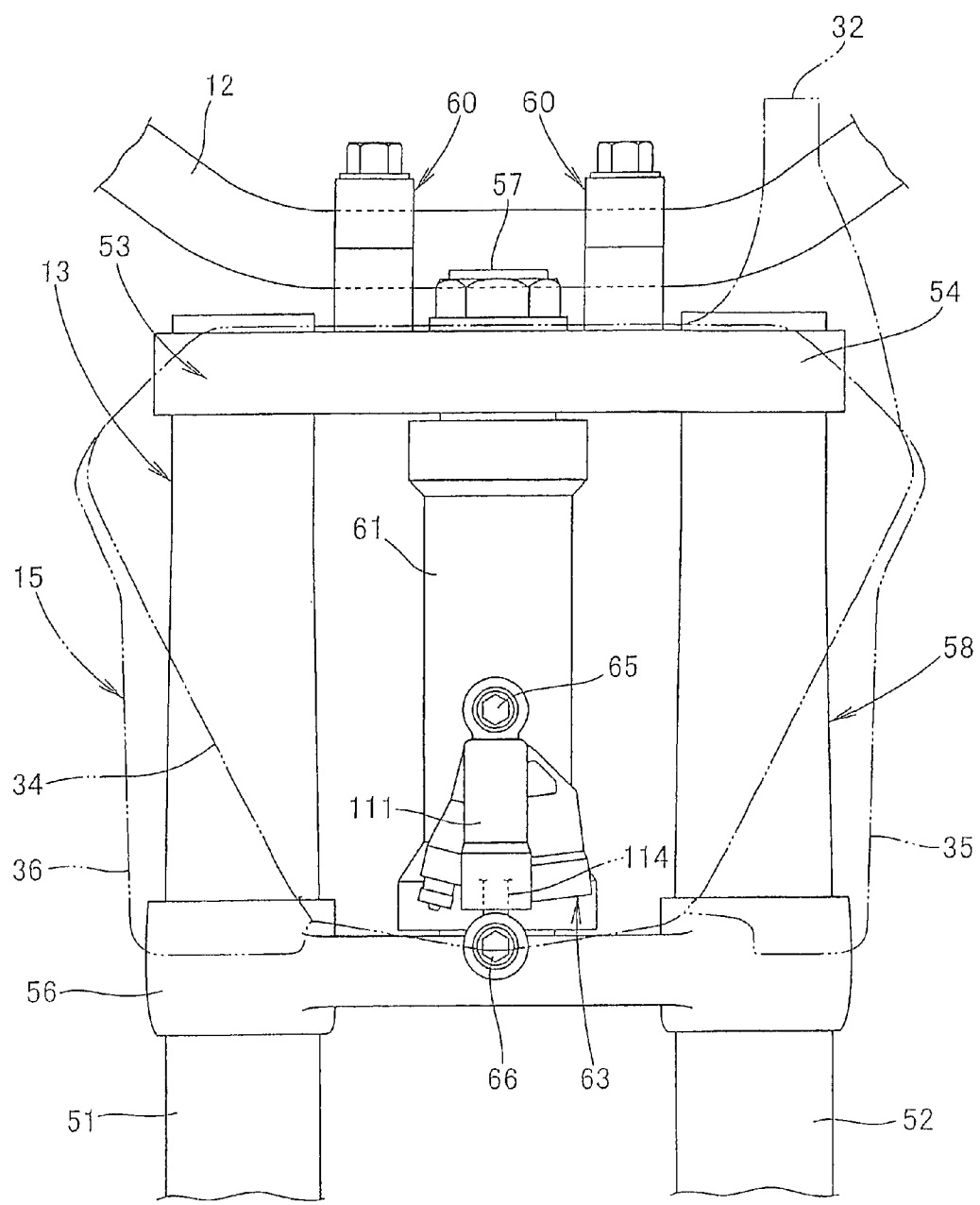
FIG. 14 is a view for illustrating the front portion of the vehicle according to another embodiment of the present invention.

FIG. 14 is a view for illustrating the front portion of the vehicle according to another embodiment of the present invention. Like reference numerals as those used in an embodiment shown in FIG. 3 refer to like parts and duplicate descriptions are omitted as may be applicable for clarity purposes.

The body 111 of the steering damper 63 is mounted to the head pipe 61 using the bolt 65, while the piston rod 114 is mounted to the bottom bridge 56 using the bolt 66.

As such, the compactly built piston rod 114, which is lighter in weight than the body 111, is mounted to the bottom bridge 56 that swivels. This arrangement allows a side making a swivel motion to be lighter in weight. Moreover, the arrangement helps make a space, in which the steering damper 63 swivels and the handlebar is operated, even smaller. The arrangement is also less susceptible to the operating force applied to the handlebar.

Figure 15:
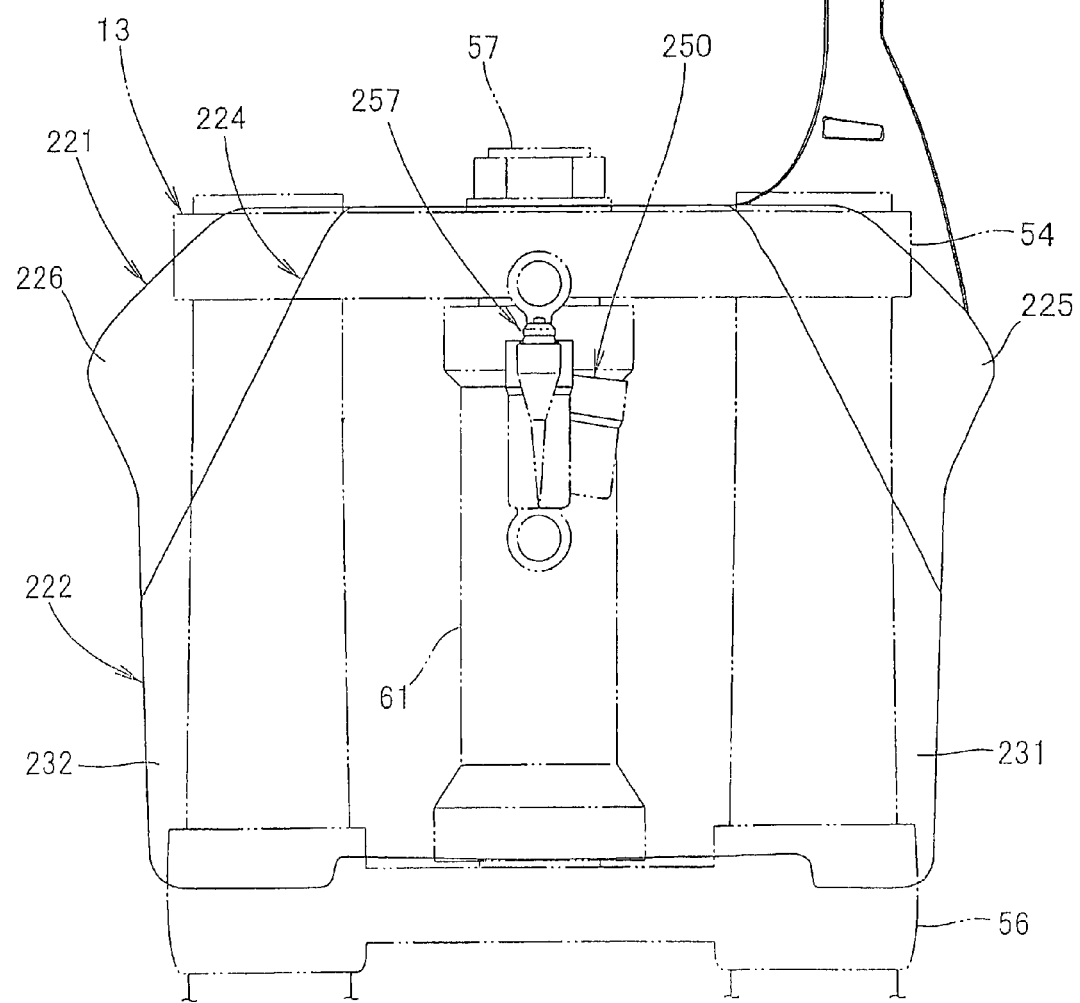
FIG. 15 is a front view showing a steering damper according to still another embodiment of the present invention.

FIG. 15 is a front view showing a steering damper according to still another embodiment of the present invention. Like reference numerals as those used in an embodiment shown in FIG. 9 refer to like parts and duplicate descriptions are omitted as may be applicable for clarity purposes.

A steering damper 250 is disposed between the head pipe 61 and the top bridge 54. The steering damper 250 includes a flow rate adjustment mechanism 257 disposed at a front portion thereof. The steering damper 250 will be described in further detail with reference to FIGS. 16(a) through 16(c).

FIGS. 16(a) through 16(c) are views for illustrating the steering damper according to still another embodiment of the present invention. FIG. 16(a) is a side elevational view, FIG. 16(b) is a view on arrow b of FIG. 16(a), and FIG. 16(c) is a view on arrow c of FIG. 16(a).

Referring to FIGS. 16(a) through 16(c), the steering damper 250 includes a body 251, a piston (not shown), and a piston rod 253. Specifically, the piston is movably inserted in a cylinder hole disposed inside the body 251. The piston rod 253 is attached to the piston.

The body 251 includes a body main body 255, a side cylinder 256, and the flow rate adjustment mechanism 257. The body main body 255 includes the cylinder hole formed therein. The side cylinder 256 is disposed on a side portion of the body main body 255. The flow rate adjustment mechanism 257 is disposed on a front portion of the body main body 255. Mounting portion 258 is integrally formed with an end of the body 251. The mounting portion 258 is mounted to either one of the head pipe and the top bridge via the spherical plain bearing 93. Mounting portion 261 integrally formed with an end of the piston rod 253. The mounting portion 261 is mounted to the other one of the head pipe and the top bridge via the spherical plain bearing 73.

As shown in FIG. 16(c), the steering damper 250 is L-shaped in a plan view. Accordingly, the flow rate adjustment mechanism 257 is away forwardly largely from the head pipe and the top bridge. As a result, the flow rate adjustment mechanism is disposed between the number plate and the top bridge. This makes it easier to mount or demount an adjustment tool to or from the flow rate adjustment mechanism 257 as accessed from an upward direction of the vehicle body. It is also easy to make an adjustment. This leads to an enhanced ease of use.

It is to be noted that the steering damper 250 may be disposed between the head pipe and the bottom bridge.

In accordance with an embodiment of the present invention, referring to FIGS. 2 and 3, the protruded portion 34 extending vertically is formed on the number plate 15 and the flat portions 35, 36 are formed on both sides of the lower portion of the protruded portion 34. It is to be noted that possible arrangements are not limited to the foregoing; rather, the protruded portion is formed only at a lower portion of the number plate, specifically a portion forward of the steering damper 63, with the remaining portions of the number plate being flat.

The number plate according to the embodiments of the present invention is favorably applicable to a competition motorcycle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A number plate for a vehicle, the vehicle comprising:
a front fork suspending a front wheel, the front fork being disposed steerably on a head pipe on a vehicle body side;
a steering mechanism including a handlebar disposed on the front fork; and
a competition identification number marked on the number plate, the number plate disposed at a front portion of a fork bridge,
the fork bridge including a top bridge and a bottom bridge, and the fork bridge connecting left- and right-hand portions of the front fork,
wherein a steering damper is directly connected to the head pipe and the bottom bridge;
wherein the number plate includes a protruded portion protruding forwardly at a center thereof and narrowing toward a bottom thereof;
wherein the number plate has a lower portion covering an area forward of the steering damper;
wherein the number plate includes a left and a right flat portion formed respectively on a left and a right lower portion of the protruded portion, and
wherein each of the left and right flat portions extends in a direction parallel to a forward edge of the bottom bridge.

2. The number plate according to claim 1,
wherein the steering damper includes:
a tubular body;
a piston movably inserted in a cylinder hole formed in the body; and
a piston rod attached to the piston;
wherein a body side mounting portion formed in the body is mounted on the head pipe and a first member of the fork bridge; and
wherein a rod side mounting portion formed on an end of the piston rod is mounted to the head pipe and a second member of the fork bridge.

3. The number plate according to claim 2,
wherein the steering damper includes a second cylinder hole communicating with the cylinder hole and a damping force adjustment mechanism adjusting a damping force by varying a flow rate of a hydraulic fluid circulating through the cylinder hole.

4. The number plate according to claim 3,
wherein the cylinder hole, the second cylinder hole, and the damping force adjustment mechanism are disposed in line in a vehicle width direction.

5. The number plate according to claim 1,
wherein the number plate includes a lower mounting tab disposed on a backside thereof, the lower mounting tab for mounting the number plate directly to the bottom bridge; and wherein the lower mounting tab extends rearwardly from the backside of the number plate and includes an inclined surface disposed on an upper surface thereof, the inclined surface being inclined in the vehicle width direction.

6. The number plate according to claim 1, wherein the number plate includes an extended portion extending upwardly from an upper end portion of the number plate.

7. The number plate according to claim 1, wherein when the number plate is viewed in front view, the number plate completely overlaps a portion of the front fork extending between the top bridge and the bottom bridge.

8. The number plate according to claim 1, wherein the lower portion of the number plate covers an area sidewards of the steering damper.

9. The number plate according to claim 2, wherein the first member of the fork bridge is the bottom bridge.

10. The number plate according to claim 5, wherein the inclined surface includes an inner inclined surface and an outer inclined surface.

11. A number plate for a vehicle, the vehicle comprising:
a front fork suspending a front wheel, the front fork being disposed steerably on a head pipe on a vehicle body side;
a steering mechanism including a handlebar disposed on the front fork; and
a competition identification number marked on the number plate, the number plate disposed at a front portion of a fork bridge,
the fork bridge including a top bridge and a bottom bridge, and the fork bridge connecting left- and right-hand portions of the front fork,
wherein a steering damper is directly connected to the head pipe and the top bridge;
wherein the number plate includes a protruded portion protruding forwardly at a center thereof and narrowing toward a top thereof; and
wherein the number plate has an upper portion covering an area forward of the steering damper,
wherein the number plate includes a left and a right flat portion formed respectively on a left and a right upper portion of the protruded portion, and
wherein each of the left and right flat portions extends in a direction parallel to a forward edge of the top bridge.

12. The number plate according to claim 11,
wherein the steering damper includes:
a tubular body;
a piston movably inserted in a cylinder hole formed in the body; and
a piston rod attached to the piston;
wherein a body side mounting portion formed in the body is mounted on the head pipe and a first member of the fork bridge; and
wherein a rod side mounting portion formed on an end of the piston rod is mounted to the head pipe and a second member of the fork bridge.

13. The number plate according to claim 12,
wherein the steering damper includes a second cylinder hole communicating with the cylinder hole and a damping force adjustment mechanism adjusting a damping force by varying a flow rate of a hydraulic fluid circulating through the cylinder hole.

14. The number plate according to claim 13,
wherein the cylinder hole, the second cylinder hole, and the damping force adjustment mechanism are disposed in line in a vehicle width direction.

15. The number plate according to claim 11,
wherein the number plate includes a lower mounting tab disposed on a backside thereof, the lower mounting tab for mounting the number plate directly to the bottom bridge; and
wherein the lower mounting tab extends rearwardly from the backside of the number plate and includes an inclined surface disposed on an upper surface thereof, the inclined surface being inclined in the vehicle width direction.

16. The number plate according to claim 11, wherein when the number plate is viewed in front view, the number plate completely overlaps a portion of the front fork extending between the top bridge and the bottom bridge.

17. The number plate according to claim 15, wherein the inclined surface includes an inner inclined surface and an outer inclined surface.

18. A number plate for a vehicle, the vehicle comprising:
a front fork suspending a front wheel, the front fork being disposed steerably on a head pipe on a vehicle body side;
a steering mechanism including a handlebar disposed on the front fork; and
a competition identification number marked on the number plate, the number plate including a plurality of tabs for mounting the number plate at a front portion of a fork bridge,
the fork bridge including a top bridge and a bottom bridge, and the fork bridge connecting left- and right-hand portions of the front fork,
wherein a steering damper is directly connect to the head pipe and the top bridge;
wherein the number plate includes a protruded portion protruding forwardly at a center thereof and narrowing toward a top portion or a bottom portion thereof;
wherein the top portion of the number plate covers an area forward of the steering damper,
wherein the number plate includes a left and a right flat portion formed respectively on a left and a right upper portion of the protruded portion, and
wherein each of the left and right flat portions extends in a direction parallel to a forward edge of the top bridge.

19. The number plate according to claim 18,
wherein the steering damper includes:
a tubular body;
a piston movably inserted in a cylinder hole formed in the body; and
a piston rod attached to the piston;
wherein a body side mounting portion formed in the body is mounted on the head pipe and a first member of the fork bridge; and
wherein a rod side mounting portion formed on an end of the piston rod is mounted to the head pipe and a second member of the fork bridge.

20. The number plate according to claim 19, wherein the plurality of tabs includes two upper directly connected to the top bridge and two lower tabs directly connected to the bottom bridge.

* * * * *